United States Patent [19]

Erdmannsdoerfer et al.

[11] Patent Number: 5,741,421
[45] Date of Patent: Apr. 21, 1998

[54] FILTER DEVICE

[75] Inventors: Hans Erdmannsdoerfer, Dobel; Helmut Storz, Benningen; Manfred Wagner, Stuttgart, all of Germany

[73] Assignee: Filterwerk Mann & Hummel GmbH, Ludwigsburg, Germany

[21] Appl. No.: 561,619

[22] Filed: Nov. 21, 1995

[30] Foreign Application Priority Data

Nov. 23, 1994 [DE] Germany .................. 44 41 608.3

[51] Int. Cl.$^6$ .................................... B01D 27/06
[52] U.S. Cl. .................. 210/450; 210/493.1; 210/493.2; 210/493.5; 210/497.01; 210/497.2; 210/506; 55/498; 55/500; 55/502; 55/521; 55/524; 55/DIG. 5; 264/DIG. 48
[58] Field of Search ............... 210/450, 493.1, 210/493.2, 493.5, 497.01, 497.2, 506; 55/521, 524, 528, DIG. 5, 498, 500, 502; 264/DIG. 48

[56] References Cited

U.S. PATENT DOCUMENTS

| 2,726,184 | 12/1955 | Cox et al. .................. 154/83 |
| 2,771,156 | 11/1956 | Kasten et al. . |
| 2,895,174 | 7/1959 | Hockett .................. 264/DIG. 48 |
| 2,962,121 | 11/1960 | Wilber . |
| 3,720,323 | 3/1973 | Landree .................. 210/493 |
| 4,861,479 | 8/1989 | Solzer .................. 264/DIG. 48 |
| 4,956,089 | 9/1990 | Hurst .................. 264/DIG. 48 |
| 4,961,974 | 10/1990 | Jones .................. 55/521 |
| 5,024,870 | 6/1991 | Jackson .................. 264/DIG. 48 |
| 5,399,264 | 3/1995 | Pulek et al. .................. 210/450 |
| 5,519,425 | 5/1996 | Dietl et al. .................. 347/87 |

FOREIGN PATENT DOCUMENTS

| 112558 | 7/1984 | European Pat. Off. . |
| 213930 | 3/1987 | European Pat. Off. . |
| 233088 | 8/1987 | European Pat. Off. . |
| 1752646 | 8/1957 | Germany . |
| 1020602 | 12/1957 | Germany . |
| 1062675 | 8/1959 | Germany . |
| 1935528 | 3/1966 | Germany . |
| 66-08972 | 12/1967 | Germany . |
| 79-02475 | 6/1979 | Germany . |
| 2163368 | 2/1986 | Germany . |
| 4206519 | 9/1993 | Germany . |
| 94-03868.6 | 8/1994 | Germany . |

OTHER PUBLICATIONS

Sakaida, Abstract of Published Japanese Patent Application No. JP 62-183818.

Primary Examiner—W. L. Walker
Attorney, Agent, or Firm—Evenson, McKeown, Edwards & Lenahan P.L.L.C.

[57] ABSTRACT

A filter device with a preferably hollow-cylindrical, pleated filter element which is arranged concentrically around a cylinder axis and through which a medium to be filtered passes. Seals are necessary on the filter device so that the medium to be filtered will not be able to leak out and so that the filter element, which typically is constructed of filter paper, must be fixed in place together with its pleats. Advantageously, an elastic composition can be disposed as a seal on at least one of the ends of the filter element, and after curing the elastic composition will fix the pleats of the filter element and will have sufficient residual elasticity to seal the filter element with respect to a central mounting tube on which it is to be mounted.

9 Claims, 1 Drawing Sheet

FILTER DEVICE

BACKGROUND OF THE INVENTION

This invention relates to a filter device with a, preferably hollow-cylindrical, pleated filter element which is arranged around a cylinder axis and through which a medium to be filtered passes, and a seal arranged on at least one end of said filter element and extending radially inwardly of said filter element so as to contact a central tube on which the filter element may be mounted.

A filter device of this kind is disclosed in published German Patent Application No. DE-OS 4,206,519, in which a pleated, hollow-cylindrical filter element is provided with plates which sealingly cover the ends, made of metal for example, or with sealing materials in the form of foils. These seals in plate or foil form extend radially inward by a certain amount into the interior cylinder, so that sealing to a central tube can be achieved.

As soon as this known filter device is inserted into the circulation system for motor oil or diesel fuel or gasoline, these seals are exposed to large tearing stresses, so that there is always a danger that the filter element will tear when inserted into the filter housing and thus not only will the sealing material be damaged, but also the filtering action will be defeated. Furthermore, these seals are exposed to great stress during operation due to the relatively high temperatures of the medium being filtered, especially in the case of motor oil, which can result in a reduction of the effectiveness of the entire filter device.

SUMMARY OF THE INVENTION

It is therefore an object of the invention to provide an improved filter device such that a lasting functionality will be assured.

Another object of the invention is to provide a filter device in which a reliable seal is produced by a simple manufacturing procedure.

These and other objects have been achieved in accordance with the present invention by providing a filter device comprising a pleated filter element which is arranged around a cylinder axis and through which a medium to be filtered passes, and a seal on at least one end of the filter element and extending radially inwardly of the filter element so as to contact a central tube on which the filter element is to be mounted; in which the seal is formed from a curable elastic composition disposed on the end so as to fix the pleats of the filter element and seal the end of the filter, the composition after curing retaining sufficient residual elasticity to seal the filter element with respect a central tube on which it is to be mounted.

The filter device of the invention advantageously adapted to solve the problem of tearing or damage of the end seals of hollow cylindrical, pleated filter elements mounted on central mounting tubes.

It is a particular advantage of the present invention that a measure that is necessary for fixing the pleats of the hollow cylindrical filter element can be combined with the production of the sealing surfaces. The residual elasticity of the elastic mass that remains after the curing or hardening or setting process is capable of assuring a sufficient sealing action for a long period of time, even in the case of filtered media which have relatively high temperatures, such motor oil at 170° C. Also, the filter devices can be replaced, as is necessary after a certain period of operation, in a simple manner because the elastic connection makes it possible to remove the filter element without any need for an expensive tool. Due to the simple construction of the filter device using only a few materials, the used filter devices can easily be recycled without any need to separate their materials.

Additional advantageous embodiments of the filter device according to the invention which make it easy to form the radially inner sealing surfaces, are described hereinafter. An optimal residual elasticity can be achieved by using appropriate mixing ratios of nitrile rubber and phenolic resin to produce the elastic composition from which the seals are made. Preferred mixing ratios of nitrile rubber to phenolic resin range from 1:0.8 to 1:1.5.

BRIEF DESCRIPTION OF THE DRAWINGS

The invention will be described in further detail hereinafter with reference to an illustrative preferred embodiment shown in the accompanying drawing figures in which.

DETAILED DESCRIPTION OF PREFERRED EMBODIMENTS

Figure 1:
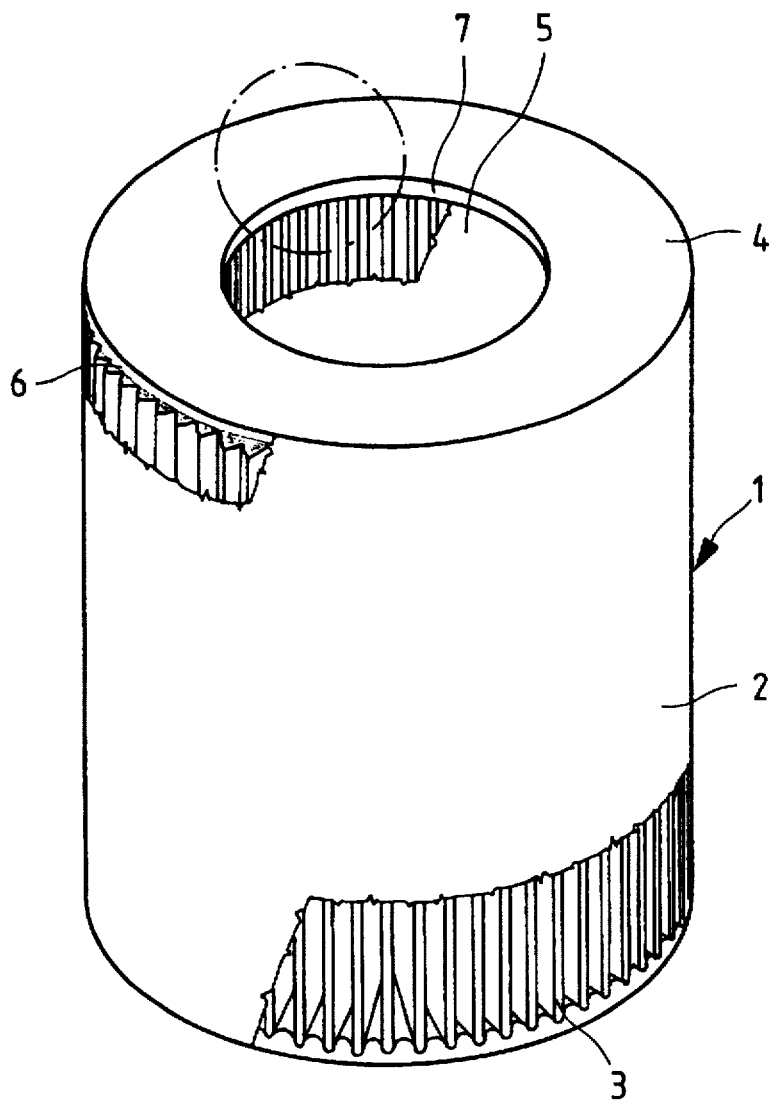
FIG. 1 is a representation of the filter device with a partially visible filter element and seals at both ends.

FIG. 1 shows a hollow cylindrical filter device 1 in which the filter element 3, made for example of filter paper folded in pleats, is situated in a filter housing 2. At the end of the filter device 1 there is a sealing closure 4 which forms a seal against a connecting piece (not shown).

Such filter devices can be employed, for example, for filtering motor oil, fuel or air in the operation of a motor vehicle with an internal combustion engine. The apparatus in which the filter device is used is omitted from the drawing to facilitate better understanding of the drawing. As a rule the medium to be filtered is delivered from the outside to the surfaces of the pleated filter element 3, and the filtered medium is discharged through a central tube which is sealingly inserted into an inner, concentric opening 5 of the closure 4. Filter devices of this general type are known in the art, for example from German Utility Model No. DE-U 18 51 221.

In the embodiment of the filter device 1 according to the invention which is shown in FIG. 1, it can be seen from the upper closure piece 4, how an elastic composition 6, which serves as the seal, has flowed, prior to a curing or hardening procedure, into the pleated folds of the filter element 3, and thereafter fixes the pleated structure in place. This means that the elastic composition 6 at temperatures above 90° C. first softens and then sets (melt-reaction adhesive). In the described embodiment, the elastic composition 6 is formed of nitrile rubber and phenolic resin, the mixing ratio of rubber to resin being from 1:0.8 to 1:1.5. Use of an appropriate thermal curing process assures that sufficient residual elasticity remains to provide an adequate sealing effect at the points of connection between the filter element and the device in or on which it is mounted. If desired, additional sealing means, such as paper rings for example, can be embedded in the elastic composition 6 in order to improve the sealing properties.

In the illustrated embodiment, the elastic composition is distributed over the entire end surface of the filter device and is extended with an inner region 7 into the concentric opening 5. For optimum sealing, however, it may be sufficient if only those portions of the closure piece 4 which lie opposite a connection piece are provided with the elastic composition 6.

Figure 2:
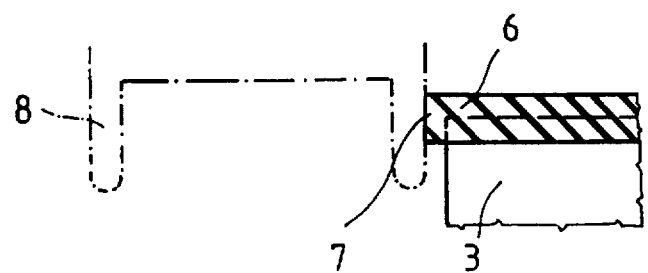
FIG. 2 is a sectional view taken through a seal at one end of the filter device.

FIG. 2 shows a sectional view of the end of the filter device 1. Here it can be seen how the elastic composition 6 extends into the pleated filter element 3 and is sealingly in contact via an inner region 7 with a central tube 8 through which the filtered medium is discharged. Sealing to an end connecting piece, not shown here, is likewise achieved by the end face surface of the elastic composition 6.

The introduction of the elastic composition 6 into the filter element 3 thus assures an outstanding sealing action and fixation of the filter element in a simple manner due to its remaining residual elasticity.

In one preferred embodiment, the elastic composition is rolled into a foil and punched out as a disk having a diameter corresponding to the end of the filter element prior to being applied to an end of the filter element. After application of the elastic composition to the filter element, the elastic composition preferably is cured by application of heat. In a particularly preferred embodiment, the elastic composition is applied to both ends of the filter element and cured simultaneously.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter device comprising:
    a pleated filter element which is arranged around a cylinder axis and through which a medium to be filtered passes, and
    a seal on at least one end of said filter element and extending radially inwardly of said filter element so as to contact a central tube on which the filter element is to be mounted;
    wherein said seal is produced by a process comprising disposing a curable elastic melt-reaction composition on said end and heating the melt-reaction composition, whereby the composition first softens and flows into the pleats of the filter element and then hardens so as to fix the pleats of the filter element and seal the end of the filter, the hardened composition having sufficient residual elasticity to seal the filter element with respect a central tube on which it is to be mounted.

2. A filter device according to claim 1, wherein said filter element is a hollow-cylindrical element arranged concentrically around said cylinder axis.

3. A filter device according to claim 1, wherein the elastic composition extends into a radially inner region of the filter element for sealing the filter element with respect to the central tube on which it is to be mounted.

4. A filter device according to claim 1, wherein additional sealing means are embedded in the elastic composition.

5. A filter device according to claim 1, wherein the filter element is constructed of filter paper.

6. A filter device according to claim 1, wherein the elastic composition is formed from a mixture of nitrile rubber and phenolic resin.

7. A filter device according to claim 6, wherein the nitrile rubber and phenolic resin are mixed in a ratio in the range from 1:0.8 to 1:1.5.

8. A filter device according to claim 1, wherein prior to application of the elastic composition to an end of the filter element, the elastic composition is rolled into a foil and punched out as a disk having a diameter corresponding to the end of the filter element.

9. A filter device according to claim 1, wherein the elastic composition is applied to both ends of the filter element and heated simultaneously.

* * * * *